United States Patent
Lundberg

Patent Number: 5,713,522
Date of Patent: Feb. 3, 1998

[54] EXHAUST NOZZLE FLAP FOR TURBOJET AFTERBURNER

[75] Inventor: Robert Lundberg, Trollhätten, Sweden

[73] Assignee: Volvo Aero Corporation, Trollhattan, Sweden

[21] Appl. No.: 617,149

[22] Filed: Mar. 18, 1996

[30] Foreign Application Priority Data

Jun. 21, 1995 [EP] European Pat. Off. ............ 95850114

[51] Int. Cl.$^6$ ................ B05B 12/00; B64C 1/00
[52] U.S. Cl. ................ 239/265.39; 239/DIG. 19; 244/131; 244/132
[58] Field of Search ............ 239/265.11, 265.19, 239/265.33, 265.35, 265.37, 265.39, 265.41, DIG. 19; 244/119, 123, 124, 131, 132; 60/271

[56] References Cited

U.S. PATENT DOCUMENTS

| | | |
|---|---|---|
| 2,544,538 | 3/1951 | Mahnken et al. |
| 2,927,424 | 3/1960 | Hyde ................ 239/265.39 |
| 3,612,400 | 10/1971 | Johnson et al. |
| 4,637,550 | 1/1987 | Nash. |
| 4,955,541 | 9/1990 | Carteron et al. .......... 239/265.39 X |
| 5,000,386 | 3/1991 | Lybarger ................ 239/265.39 |
| 5,079,915 | 1/1992 | Veau. |
| 5,584,173 | 12/1996 | Lybarger .......... 239/265.11 X |

FOREIGN PATENT DOCUMENTS

| | | |
|---|---|---|
| 0 623 742 A1 | 9/1994 | European Pat. Off. |
| 1198723 | 12/1959 | France. |
| 643696 | 9/1950 | United Kingdom. |
| 2 240 822 | 8/1991 | United Kingdom. |

Primary Examiner—Andres Kashnikow
Assistant Examiner—Robin O. Evans
Attorney, Agent, or Firm—Pollock, Vande, Sande & Priddy

[57] ABSTRACT

A plurality of elongate segments, joined along their abutting side edges, form a variable geometry exhaust nozzle for a turbojet engine afterburner. The segments may be planar or slightly curved. Each segment is devoid of metal on its "hot" side and has at least one elongate edge portion bent in not more than about 90° towards the "cold" side of the segment at least along the longitudinal side facing the adjacent panel. The panels are mutually joined to form said segment under the intermediation of metal elements, preferably of U-shape, for gripping adjacent pairs of bent portions of the respective panel pairs, at least some of said metal elements and the respective edge portions thereof having holes for accommodating hinge shafts and/or actuation means such that on each segment a continuous ceramic surface, entirely free of metal, faces the hot exhaust gas flow of the engine.

2 Claims, 5 Drawing Sheets

EXHAUST NOZZLE FLAP FOR TURBOJET AFTERBURNER

The present invention relates to a variable geometry exhaust nozzle for a turbojet engine afterburner. More particularly, the invention is directed to hinged, adjustably suspended, flap-like area segment which, together with further segments formed of a ceramic material, comprise the circumferential wall of the afterburner.

To increase the thrust and efficiency of turbojet engines, certain types of such engines are provided with an afterburner or augmenter which preferably is provided with an exhaust nozzle having a variable cross-sectional area. The peripheral wall of the outlet nozzle comprises a first set of flap-like segments in a convergent portion of the nozzle to reduce its area and a further set of segments or flaps in a diverging portion of the nozzle for increasing its cross-sectional area. In both cases the peripheral wall is formed of circumferentially alternately arranged area or surface segments and intermediate seal segments movably suspended and adjustable by means of pressure cylinder-operated linkage systems or the like.

In nozzles having a variable geometry, and particularly in nozzles providing for directional variation of the entire exhaust flow, known as thrust vectoring nozzles, the flaps or segments of the exhaust nozzle are intensively heated. The position of the segments within the engine makes it difficult, however, to cool them. It has been suggested that such segments may be cooled by means of, for example, film cooling; however, it is technically complicated to convey cooling air to said portion of the afterburner nozzle. Further improvements of afterburner's efficiency also require that an ever decreasing amount of cooling air be available for the cooling of the flaps or segments.

In afterburners having thrust vectoring nozzles, the segments furthermore are subjected to very large forces since, by means of said segments, deflection of the exhaust jet at an angle to the longitudinal axis of the engine is effected.

Conventional nozzle flaps or segments have been made of metal, often having a plasma-sprayed heat protection coating of a ceramic material such as $ZrO_2$ at its surface which faces the heated side. The metal provides the necessary mechanical strength of the flap or segment and also enables the use of a hinged mounting of the flap or segment to the nozzle wall, while the ceramic material provides the necessary heat resistance. However, due to the insufficient thermal protection action of the $ZrO_2$ coating it has been found, to be difficult to obtain a satisfactory service life of such flaps or segments.

It has also been suggested to attach plates of ceramic material to metal supports by means of rivets, bolts, or similar fastening means, also formed of metal. Such fastening means, however, penetrates the ceramic plate on its hot side, and consequently the plate, and also the segment exhibits a short service life.

U.S. Pat. No. 4,737,550 discloses a nozzle segment which also is composed of two different materials, namely a bottom part or plate of a heat-resistant ceramic material, and a support member of high-strength metal. To accommodate the differences in thermal expansion coefficient of the associated materials, the plate has been shaped in a very complicated form with strengthening ridges and back-folded portions of the material. The plate and hence the flap thereby becomes very expensive to fabricate and manufacture since it is difficult to form articles of ceramic material, and particularly of ceramic fibers, having folds over angles greater than 90°. It is also very difficult to finish machine articles of ceramic materials since they are extremely hard.

Usually, the composite materials used in nozzle flaps or segments in turbojet engines are manufactured by the steps of stacking and forming ceramic fiber fabric into a molded preformed element. Thereafter, the matrix is added in the form of a ceramic powder slurry, a pre-ceramic polymer precursor, or as gaseous reactants. The matrix or the matrix precursor then fills the cavities in the preformed stacked fiber fabrics. Thereafter, the composite material may be further densified by utilizing increased pressures (uniaxial hot pressing or hot isostatic pressing) or by precursor pyrolysis followed by further addition of precursor and pyrolysis.

When utilizing this kind of manufacturing technique, planar shapes of uniform thickness, i.e. panels, are easiest to manufacture. However, non-planer forms can be manufactured only if it is possible to form the ceramic fiber fabrics into said shape, i.e. slightly curved panels.

The object of the present invention is to provide a hingedly and adjustably suspended flap-like area segment for a turbojet engine afterburner which is easy and simple to manufacture and has a non-complicated structure requiring a minimum of finishing, and having its surface which faces the engine exhaust flow entirely devoid of metal. In accordance with the present invention, these results are obtained by forming a segment comprising at least two mutually adjacent elongated planar (or slightly curved) panels formed solely of ceramic material and having an edge portion bent in not more than 90° toward the "cold" side of the segment, at least along the longitudinal side facing the adjacent panel. As a result, portions of the panels are mutually joined to form said segment under the intermediation of metal elements, preferably U-shaped which grip adjacent pairs of bent portions of the respective panel pairs. At least some of said metal elements may be provided with holes to accommodate hinge shafts and/or actuation means so that on each segment a continuous ceramic surface, entirely free of metal, faces the hot exhaust gas flow from the engine.

The main advantage of the inventive segment is that its strength thus obtained is sufficient to accommodate the forces encountered during use, substantially pressure forces, without any need of providing supplementary strengthening measures. The segments are easy to manufacture by holding fiber fabrics or fiber preforms in a mold during matrix infiltration.

The invention will be further described below with reference to the accompanying drawings, in which.

Figure 1A:
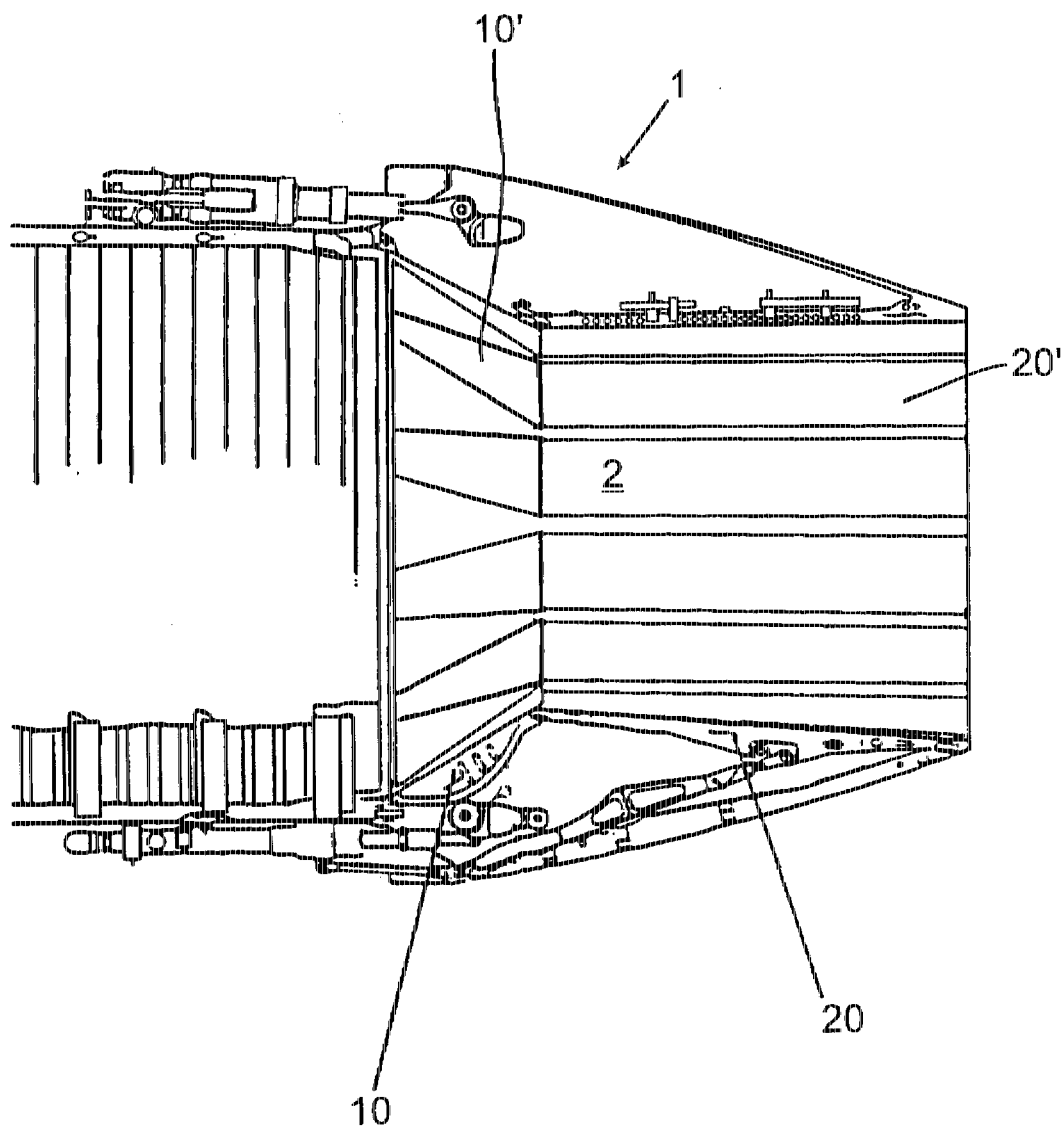
FIG. 1a is a diagrammatic longitudinal section and FIG. 1b an end view of the afterburner portion of a turbojet engine with an outlet in the form of a nozzle of variable cross-sectional area.
Figure 1B:
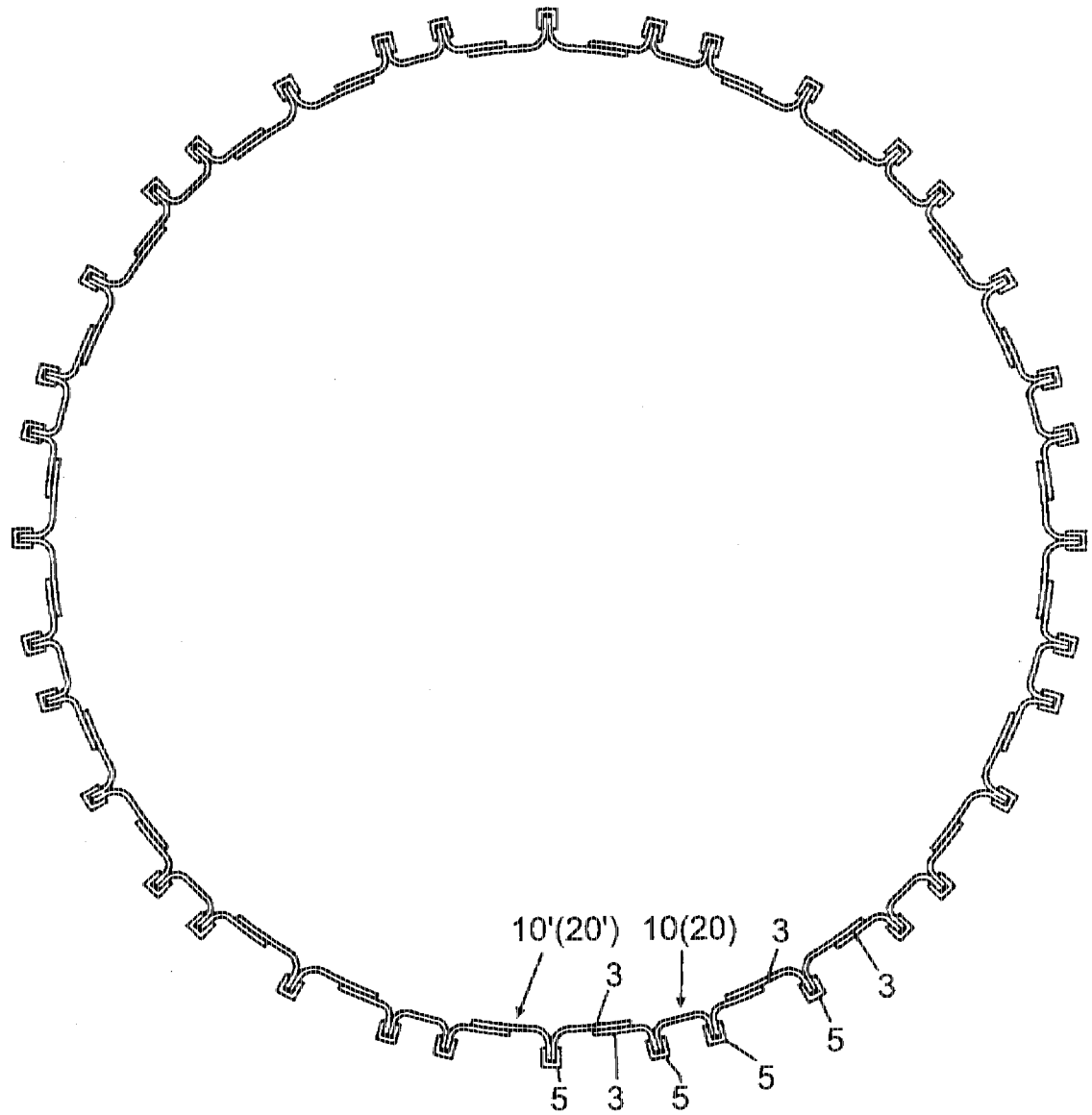

FIGS. 1a and 1b diagrammatically illustrate the afterburner portion 1 of a turbojet engine. The outlet portion 1 has the form of a nozzle 2 with a variable cross-sectional area. To provide for area variation, the peripheral wall of the nozzle is formed of two sets of flap-like surface segments 10 and 20 arranged axially after each other and circumferentially distributed around the longitudinal axis of the engine. Each segment is hingedly suspended at its upstream end, each of the first set being hingedly suspended from the engine or afterburner wall, and each of the second set being hingedly suspended from the downstream end of the respective segment of the first upstream set. Slots or openings between the segments 10, 20 which might form during areal variations are covered by suitable seal segments 10', 20' (see FIG. 1b) extending radially inwardly thereof and of similar form as the surface segments.

Figure 2:
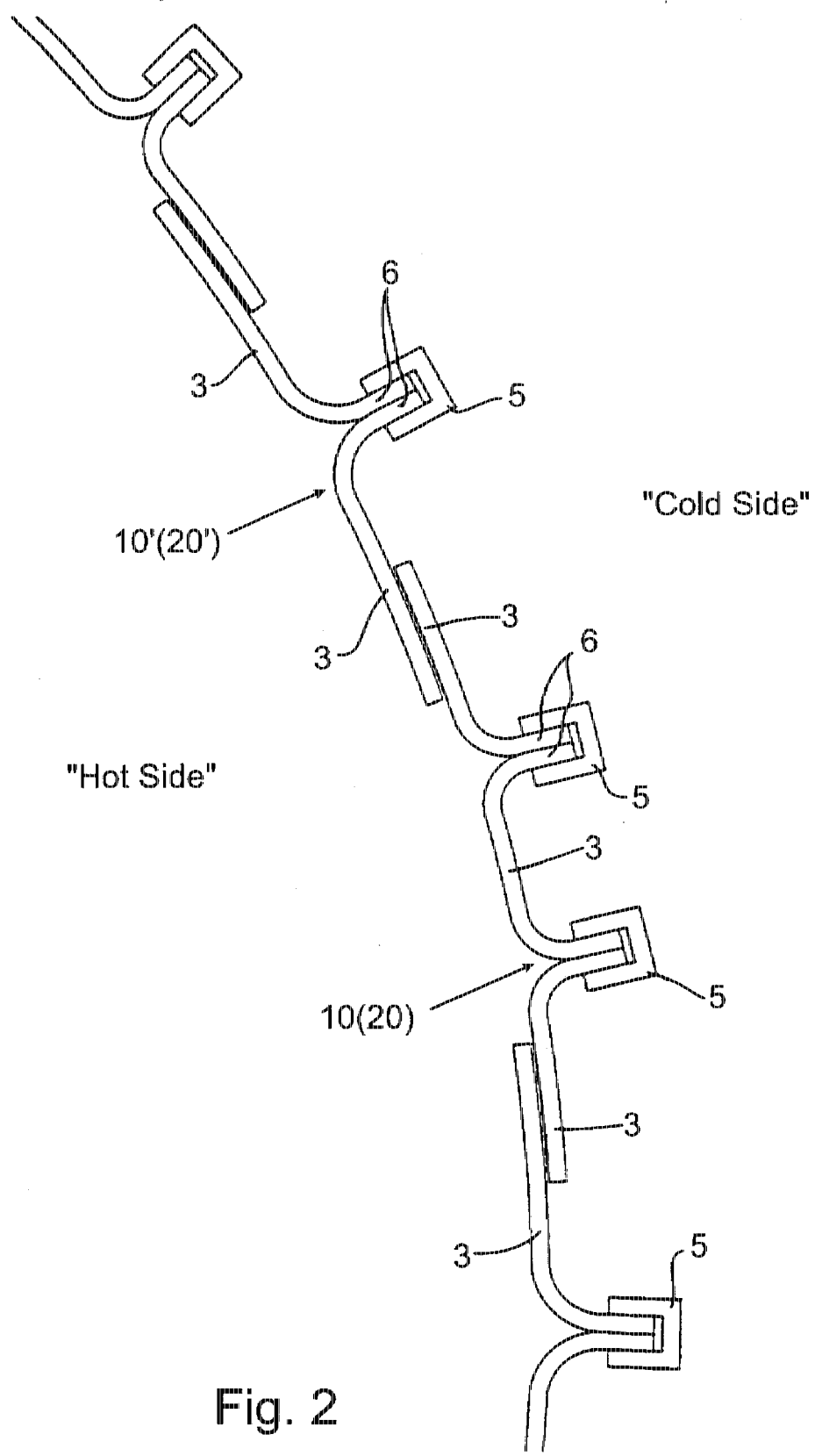
FIG. 2 is an end view of the nozzle wall surface segment arrangement similar to FIG. 1b but to an enlarged scale.
Figure 3:
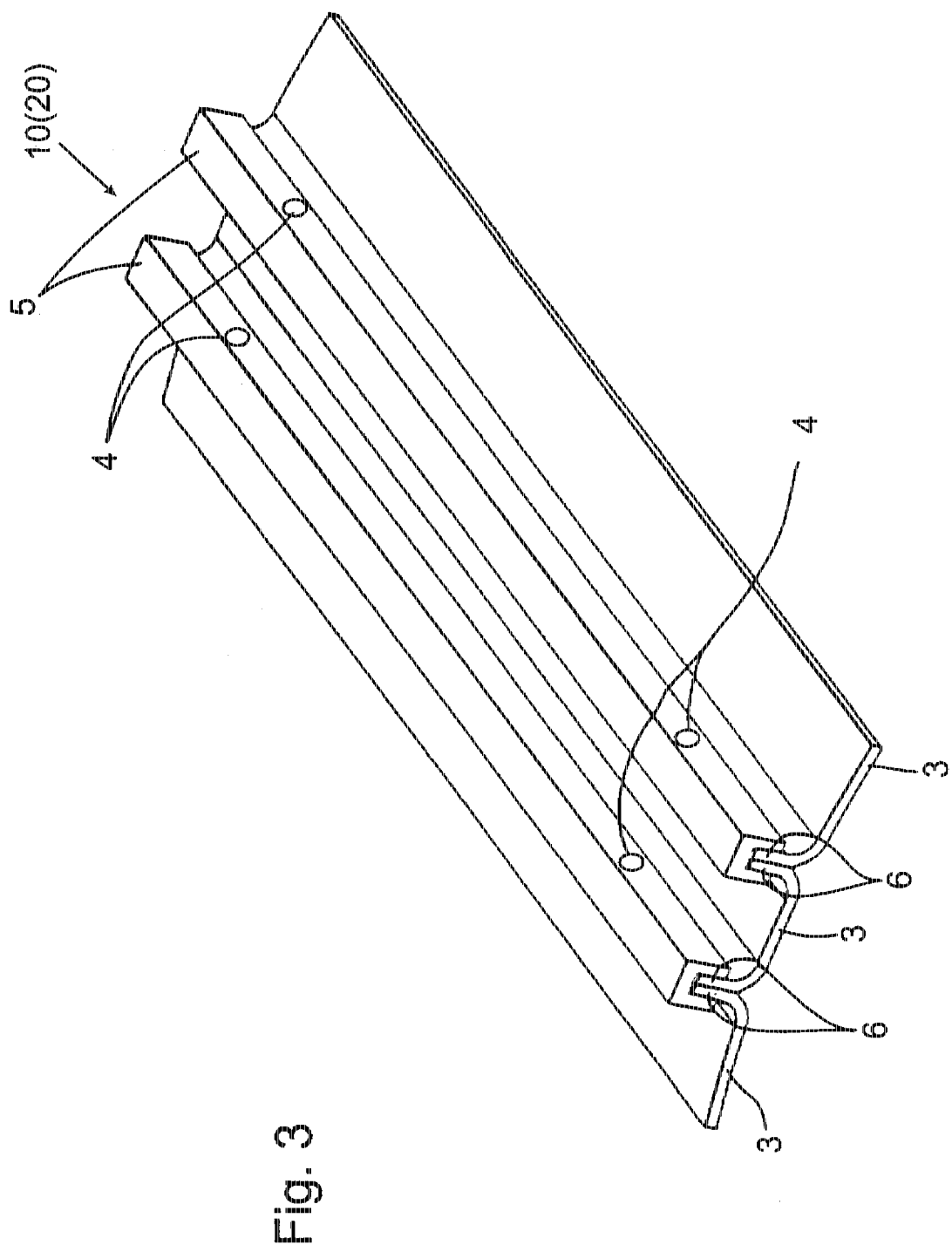
FIG. 3 is a perspective view of a flap-like nozzle wall surface segment made according to the invention which, together with a plurality of similar segments in a circumferential relationship and with intermediary seal segments, form the peripheral wall of the nozzle.
Figure 4:
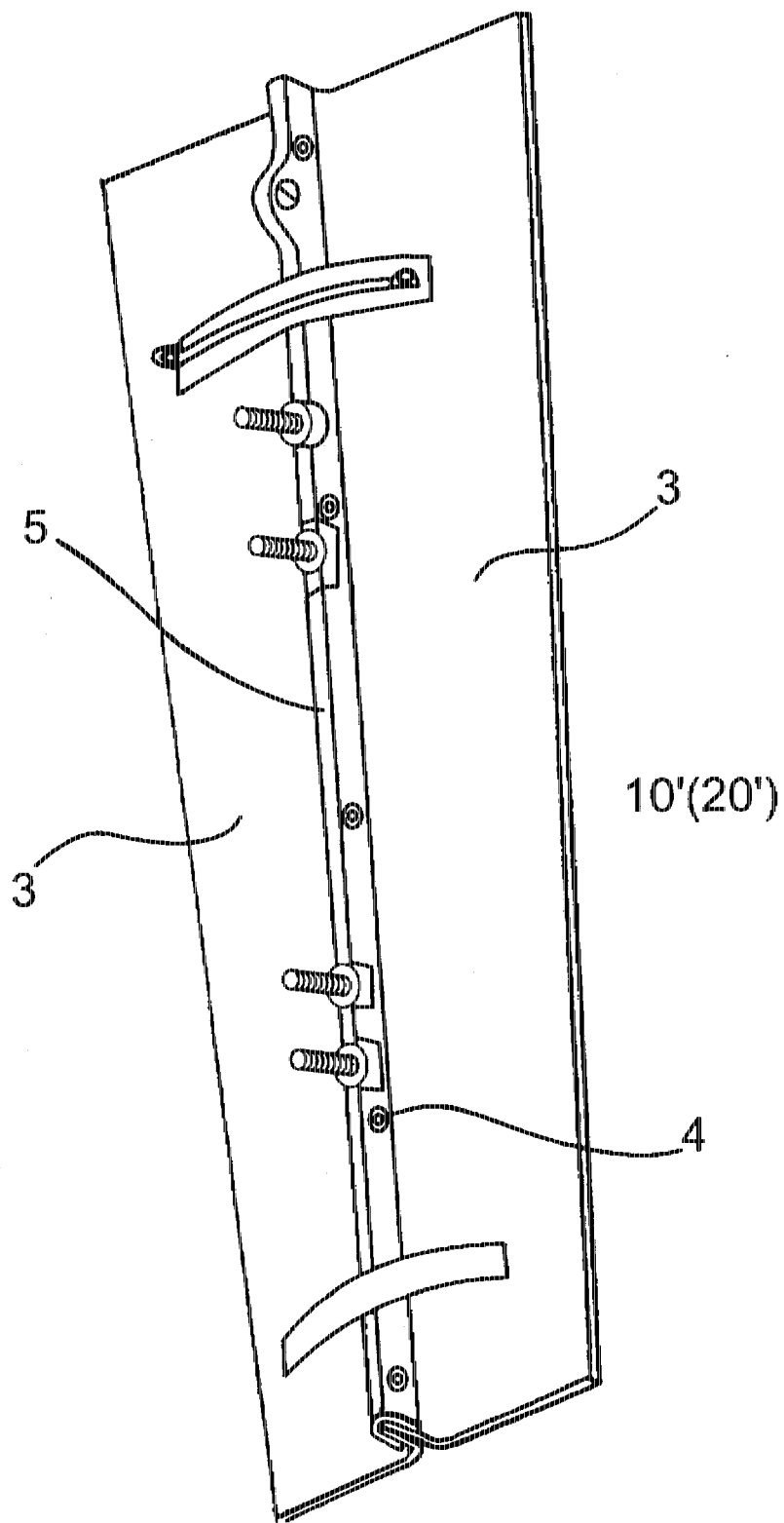
FIG. 4 illustrates a seal segment with a shape diverging in the gas flow direction.

As is evident from FIGS. 2–4, a segment 10, 20 is comprised of at least two elongated planar or slightly curved panels 3 entirely of ceramic material. Said panels 3 are provided with bent edges 6 directed at an angle of not more than about 90° to the rear or "cold" side of the segment along at least one of the longitudinal sides thereof. When joining the panels 3 to form the segment 10, 20, one or more metal pieces or securing means 5 are pushed over mutually engaging edges 6 of adjacent panels 3. The securing means preferably are made of sheet metal and appropriately of U-shape, and penetrating holes 4 are formed in at least some of said securing means 5 as well as through the edges 6 of the panels 3 which are aligned with the holes in securing means 5 to accommodate the required suspension shafts, joining means, and/or actuation means (not illustrated).

The continuous ceramic surface facing the hot exhaust flow of the engine is thus entirely devoid of metal and therefore provides a very resistant segment having a long service life of low weight. Although only the surface segments have been described in detail, the same conditions also apply to the intermediary seal segments 10', 20'.

To form the panels either as illustrated in FIG. 3 or in FIG. 4 is very advantageous from a manufacturing point of view since the fibers in the ceramic material do not need to be bent more than 90° and the finished panel requires a minimum of finishing machining.

FIG. 3 illustrates a finished flap or segment comprising three joined panels 3, over the bent edges 6 of which metal securing means 5 have been mounted. The shape of the segment provides a very torsionally-stiff structure which does not need a supporting backing as is the case in prior flaps formed of ceramic materials. Compared to conventional flaps of metal having a ceramic heat-protective coating, the means of the present invention provides a weight saving of about 40%. Ceramic materials which can be utilized in the segment according to the invention usually are fibers and matrices of carbon, silicon carbide, silicon nitride, aluminum oxide, zirconium oxide or other refragtory oxides, carbides or borides. As examples of materials which have been tested in this application are SiCf/SiC, SiC-coated Cf/C, SiCf/Al2O3, SiCf/Si3N4 in which f denotes fiber.

Flaps or segments of ceramic material preferably are manufactured in a known way by stacking fiber fabrics or weaves in a clamp or mold. The matrix is then infiltrated as a ceramic powder slurry, as a preceramic polymer precursor, or as gaseous reactants. The matrix or matrix precursor fills the pores in the fiber preform made of stacked fabrics. The infiltrated composite can be further densified by use of elevated pressures (uniaxial hot pressing or hot isostatic pressing) or by precursor pyrolysis followed by further precursor infiltrations and pyrolyses. With this kind of manufacturing technique, flat shapes with a uniform thickness are easiest to manufacture. Shapes slightly differing from a planar form can be made as long as it is possible to drape the ceramic fiber weaves to that shape (i.e. slightly curved panels).

The inventive embodiment of the surface segments thus also might be used in the manufacture of the seal segments 10', 20', which are located on the hot side of the surface segments 10, 20 in order to bridge the slots or openings forming therebetween during the adjusting movements thereof.

FIG. 4 illustrates an example of a seal segment 20' having a diverging shape in the direction of gas flow. The upwardly bent edges 6 of two mutually adjacent panels 3 are joined by means of a continuous U-profile of sheet metal with mounting points secured thereto for actuating rods etc. Of course the seal segments 10' might be formed in the same manner but then shaped convergent in the gas flow direction.

What I claim is:

1. A variable geometry exhaust nozzle for a turbojet engine afterburner in which the nozzle is formed of a plurality of flap-like areal segments circumferentially spaced about the wall of the exhaust nozzle;

each said segment being formed of at least two elongate, circumferentially spaced, mutually adjacent, substantially planar panels, formed substantially of a ceramic material, each said panel having its elongate edges bent inwardly, not more than about ninety degrees, towards the cold side of the segment, and fastening means for mutually joining the adjacent edges of each pair of said segments along said elongate edges, whereby each segment facing the hot exhaust gas flow from the engine is free of metal.

2. The exhaust nozzle of claim 1 in which said fastening means comprises a generally U-shaped metal gripper element adapted to fit over adjacent pairs of bent edges of adjoining ceramic segments.

* * * * *